Patented Jan. 26, 1943

2,309,575

UNITED STATES PATENT OFFICE 2,309,575

GRINDING WHEEL

Loring Coes, Jr., Brookfield, Mass., assignor to Norton Company, Worcester, Mass., a corporation of Massachusetts No Drawing. Application June 4, 1942, Serial No. 445,801

10 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde. This application is a continuation in part of my copending application Serial No. 417,486 filed November 1, 1941.

One object of the invention is to provide a superior plasticizer for abrasive grains for the manufacture of the foregoing type of abrasive composition. Another object of the invention is to provide an improved dry snagging wheel. Another object of the invention is to provide a grinding wheel or other solid abrasive article which, in various embodiments, may be substituted for abrasive articles bonded with shellac, rubber or phenol-formaldehyde, and which will remove a greater amount of metal for a given wheel wear.

Another object of the invention is to provide an ingredient for assisting the conversion of an aromatic amine-aldehyde resin, particularly aniline-formaldehyde, to the infusible condition. Another object of the invention is to provide a mixing plasticizer for abrasive grains having properties superior to furfural for the manufacture of the type of abrasive articles indicated. Another object of the invention is to provide a mixing plasticizer which does not react to form water.

Another object of the invention is to provide a wetting agent for carrying out the dry granular mix method in the manufacture of the type of abrasive articles indicated of superior quality. Another object is to avoid or prevent swelling of the abrasive article; to permit cold pressing and curing without pressure, and to avoid the formation of any water during the cure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —CH$_2$— groups to form a tough, heat resistant, semi-thermoplastic resin. I may add some of the formaldehyde after the initial condensation, in the form of paraformaldehyde, or by the addition of hexa-methylene-tetramine.

As examples of the halogenated organic compound, I may use any of polyvinyl chloride, polyvenylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the ethers hereinafter described, the halogenated organic compound may be omitted altogether.

Since the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware.) The furfural cross links the polymer and, therefore, converts it to the "infusible" condition. A stoichiometric quantity of aniline and formaldehyde condensed in the presence of a strong acid is believed to produce a resin which is structurally represented thus:

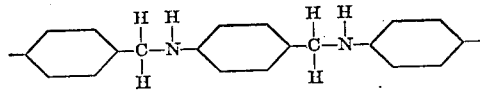

etc. Such a resin cross linked with furfural is believed to be represented thus:

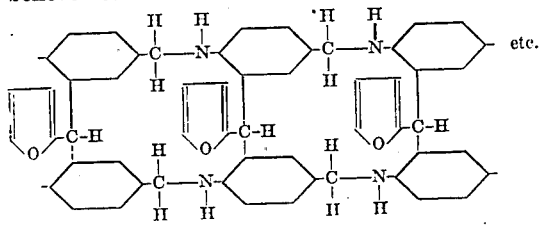

etc.

My invention consists in the use of dichlor diethyl ether or other polyglycol dichloride as the wettant-plasticizer for grinding wheels and other solid abrasive articles made out of abrasive grains bonded with aromatic-amine-aldehyde resin with or without the use of other halogenated compounds, with or without other fillers, and with or without the use of other wettant plasticizers. For example, a mixture of dichlor diethyl ether and furfural may be used to wet the abrasive grains, but at present I prefer to use dichlor diethyl ether alone. This ether is:

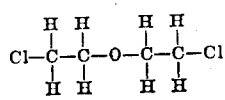

I believe it cross links the aniline-formaldehyde polymer thus:

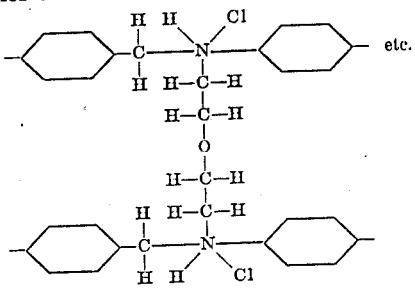

etc. It will be noted that chlorine has migrated to the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Tri-glycol dichloride is written thus:

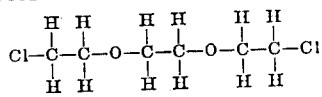

It will thus be seen that it is definitely related to dichlor diethyl ether which can also be called diglycol dichloride. In other words, my invention consists in the use of diglycol dichloride or tri-glycol dichloride in the combination explained. I believe that other poly-glycol dichlorides may also be used. For instance, tetra-glycol dichloride would be written thus:

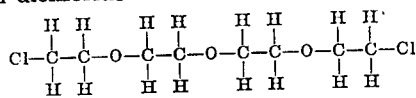

However, the compounds of large molecular weight, that is, having additional $C_2H_4$ groups, are solids and are not usable in my invention. Therefore, I use any poly-glycol dichloride selected from the group consisting of the di-, tri-, tetra-, and penta-poly-glycol dichlorides or mixtures of two or more of them. Confusion must not be had with polymers which might have similar names. Therefore, it is proper to define the compounds usable in the present invention as monomeric compounds. The full definition thus becomes monomeric poly-glycol dichloride selected from the group consisting of the di-, tri-, tetra-, and penta-glycol dichlorides.

All of these compounds are ethers, as the structures show. It is more convenient, however, to define them as poly-glycol dichlorides because the nomenclature then fits all of them. For example, tri-glycol dichloride would not ordinarily be called an ether although it unquestionably is an ether.

*Example I*

Two hundred and ten grams of #80 grit fused alumina is stirred with four and five tenths cubic centimeters of dichlor diethyl ether. Twelve and eight tenths grams of soluble anhydrite ($CaSO_4$) and forty-two and eight tenths grams of aniline formaldehyde resin made from one and five hundredths molecular proportions of formaldehyde are added. The whole is mixed.

The free flowing granular mix is cold molded under a pressure of three tons to the square inch. The cold molded objects are then packed in sand and baked for eight hours at 100° C. Test bars made in this way showed a modulus of rupture of 2600 pounds to the square inch which indicates a high tensile strength for abrasive products made with this kind of resin.

Example II

Eight hundred and fifty-eight cubic centimeters of aniline is dissolved in eight liters of water containing nine and three tenths mols of hydrochloric acid. To this is added seven hundred and fifty cubic centimeters of formalin solution containing four tenths grams of formaldehyde per cubic centimeter. After standing for one hour, a quantity of sodium hydroxide is added equivalent to the hydrochloric acid present. The precipitated resin is filtered, washed, dried, and ground to a fine powder. Into each ten pounds of this powdered resin I mix two and two tenths pounds of polyvinyl chloride. Twenty-eight and one tenth pounds of a porous relatively pure grade of fused alumina abrasive #20 grit size is wet with twenty-three hundredths of a pound of triglycol dichloride. Then five and nine tenths pounds of the above resin is intimately mixed with the fused alumina wet with dichlor diethyl ether spread in an eighteen inch mold with a five inch arbor, cold pressed under a pressure of three tons to the square inch, transferred to an oven, and baked for one hour and a half at 160° C.

Example III

Thirty-seven pounds of #14 mesh grit size fused alumina abrasive is placed in a mixing pan and wet with five hundred and forty cubic centimeters of triglycol dichloride. To this are added nine pounds of the resin of Example II and two pounds of cryolite. The mixture is spread in a sixteen inch mold with a six inch arbor and cold pressed under a pressure of three tons to the square inch. Then the "green" wheel is stripped from the mold and heated in an oven for eight hours at a temperature of 100° C.

Example IV

Nineteen hundred and eighty grams of diamino diphenyl methane is dissolved in eight liters of water containing twenty mols of hydrochloric acid. To this solution is added eight hundred cubic centimeters of formalin solution containing four tenths gram of formaldehyde per cubic centimeter. After standing for one hour, a quanity of sodium hydroxide is added equivalent to the hydrochloric acid used. The precipitated resin is filtered, washed, dried, and ground to a fine powder.

Eight hundred and eighty-five grams of #60 mesh grit size fused alumina is wet with twenty-five cubic centimeters of trichlor-diethyl ether. Into the mixing pan containing the wetted abrasive is dumped one hundred and sixty grams of the above powdered resin and forty-nine grams of polyvinyl chloride. Mixing is continued. This mixture is spread in an eight inch mold and cold pressed under a pressure of one hundred and fifty tons. The "green" wheel is then removed from the mold and baked at a temperature of 100° C. for eight hours. This constitutes a grinding wheel the resin bond of which is hard, tough and heat resistant. During a grinding operation, the bond of such a wheel, as well as the bonds of the wheels of the other examples, liberates hydrogen chloride at the grinding line which appears to have a pronounced effect on the grinding operation.

Example V

Eight hundred and fifty-eight cubic centimeters of aniline is dissolved in eight liters of water containing nine and three tenths mols of phosphoric acid. To this is added eight hundred and fifty cubic centimeters of formalin solution containing four tenths gram of formaldehyde per cubic centimeter. After standing for one hour, a quantity of sodium hydroxide is added equivalent to the phosphoric acid present. The precipitated resin is filtered, washed, dried, and ground to a fine powder. Into each ten pounds of this powdered resin, I mix two and two tenths pounds of tetra chlorpentane. This substituted paraffine appears to give somewhat better results than the others. However, in the usual case, the compound may not have an exact formula. It may be a mixture of, for example, tri-chlorpentane, tetra-chlorpentane and hepta-chlorpentane, averaging perhaps tetra-chlorpentane. Similarly, instead of using the hexa-chlorethane, I may use tetra-chlorethane and tri-chlorethane and mixtures of these and compounds averaging such formulae. As stated, I could also substitute ethylene iodide or beta butylene bromide or other similar compounds. Such compounds may be fully halogenated or they may be only partly halogenated.

Twenty-eight and one tenth pounds of a porus, relatively pure grade of fused alumina abrasive, #20 grit size, is now wet with twenty-three hundredths of a pound of triglycol dichloride. Five and nine-tenths pounds of the above mixture of aniline formaldehyde resin and halogenated paraffine are intimately mixed with the fused alumina wet with said ether and spread in an eighteen inch mold with a five inch arbor and cold pressed under a pressure of three tons per square inch. The mold is then stripped and the "green" wheel is baked at a temperature of 100° C. for eight hours.

Example VI

Thirty-seven pounds of #14 mesh fused alumina abrasive is placed in a mixing pan and wet with five hundred and forty cubic centimeters of trichlor diethyl ether. To this are added nine pounds of the mixture of resin and any halogenated paraffine of Example V and two pounds of cryolite. Mixing is continued and the dry granular mix thus produced is spread in a sixteen inch mold with a six inch arbor and pressed under a pressure of five hundred tons. The wheel is then stripped from the mold and baked for eight hours at a temperature of 100° C.

It may be noted at this point that in all the examples the hot pressing method can be employed but since it is cheaper to cold press and then bake and with the present invention the results are equally good, there is no particular point in hot pressing.

Example VII

Eight hundred and eighty-five grams of #60 mesh grit size fused alumina is wet with twenty-five cubic centimeters of triglycol dichloride. One hundred and sixty grams of the powdered resin from Example II and forty-nine grams of chlorinated eicosane is added. After mixing to form a dry granular mix, it is spread in an eight inch mold and pressed under a pressure of one hundred and fifty tons per square inch and then stripped from the mold and baked at a temperature of 100° C. for eight hours.

Fully chlorinated eicosane is not readily available and as a practical matter, partially chlorinated eicosane is quite satisfactory. Furthermore, the name eicosane has been chosen as the proper chemical name for the product with twenty carbon atoms, more or less, sold under the trade mark "Chlorcosane", which is probably a mixture of chlorinated high molecular weight paraffines averaging twenty carbon atoms or thereabouts.

*Example VIII*

Eight hundred and fifty-eight cubic centimeters of aniline is dissolved in eight liters of water containing nine and three tenths mols of hydrochloric acid. To this is added eight hundred and fifty cubic centimeters of formalin solution containing four tenths gram of formaldehyde per cubic centimeter. After standing for one hour, a quantity of sodium hydroxide is added equivalent to the hydrochloric acid present. The precipitated resin is filtered, washed, dried, and ground to a fine powder. Into each ten pounds of this powdered resin I mix one pound of ethylene chlorhydrin.

Twenty-eight and one tenth pounds of a porous, relatively pure grade fused alumina abrasive #20 grit size is now wet with twenty-three hundredths of a pound of triglycol dichloride. Five and nine-tenths pounds of the above mixture of aniline formaldehyde resin and the ethylene chlorhydrin are intimately mixed with the fused alumina wet with said ether, spread in an eighteen inch mold with a five inch arbor, cold pressed under a pressure of three tons per square inch; the wheel is stripped from the mold and baked at a temperature of 100° C. for eight hours.

*Example IX*

Thirty-seven pounds of #14 mesh fused alumina abrasive is placed in a mixing pan and wet with five hundred and forty cubic centimeters of triglycol dichloride. To this are added nine pounds of the resin and halohydrin mixture of Example VIII and two pounds of cryolite. Further mixing is caused to produce a dry granular mix which is spread in a sixteen inch mold with a six inch arbor and pressed under a pressure of five hundred tons. The wheel is then stripped from the mold and baked for eight hours at 100° C.

*Example X*

Eight hundred and eighty-five grams of #60 mesh fused alumina is wet with twenty-five cubic centimeters of triglycol dichloride and then mixed with one hundred and sixty grams of the powdered resin from Example II and forty-nine grams of amylene chlorhydrin. The mixture is spread in an eight inch mold and pressed under a pressure of one hundred and fifty tons; the wheel is stripped and baked at 100° C. for eight hours.

*Example XI*

One thousand and seventy grams of metatoluidine, $CH_3C_6H_4NH_2$, is dissolved in eight liters of water containing ten mols of hydrochloric acid. To this solution is added eight hundred and fifty cubic centimeters of forty per cent formalin. After standing for one hour, a quantity of sodium hydroxide is added equivalent to the hydrochloric acid used. The precipitated resin is filtered, washed, dried and ground to a fine powder.

Eight hundred and eighty-five grams of #60 mesh grit size fused alumina is first wet with thirty cubic centimeters of triglycol dichloride. Then one hundred and sixty grams of the powdered resin from Example II and twenty grams of propylene chlorhydrin are added and mixed to produce a dry granular mix. This mixture is spread in an eight inch mold and pressed under a pressure of two hundred tons, then stripped from the mold, and the "green" wheel is baked in an ordinary oven at a temperature gradually rising to 175° C. and maintained at this temperature for three hours.

For the acid used in condensing the resin, besides hydrochloric and phosphoric acids, any of the following acids or many others may also be used:

Hydriodic acid
Tri-chlor acetic acid
Di-chlor acetic acid
Maleic acid
Oxalic acid
Picric acid
Sulphuric acid The requirement is that the acid should be at least as strong as phosphoric acid to give the best results.

The various halogenated organic compounds mentioned herein cross link the resin at the amino groups. The dichlor diethyl ether, as previously set forth, cross links the resin at the amino groups. When this ether and also another halogenated compound are used (as in the case of all the examples except Example I), the cross linking of chains is effected by radicals from both of the chlorinated ether and the other halogenated compound, more or less at random and in proportion to the number of molecules of each present. It is believed, therefore, to be unnecessary to set forth herein any more structures but reference is made to copending application Serial No. 411,249 filed September 17, 1941, by my colleague, Samuel S. Kistler, assigned to the assignee hereof, wherein a great many representative structures which are believed to typify the conditions are set forth. In said prior application of Kistler, however, no dichlor diethyl ether is disclosed.

The reason why triglycol dichloride is preferred to furfural is that during the final cure and alkylation, no water is liberated. If we have a resin consisting of chains as follows:

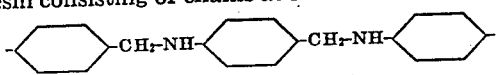

etc., and we then heat it in the presence of furfural,

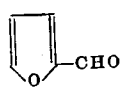

the group

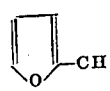

forms the connecting link between chains and the reaction liberates water. On the other hand, when dichlor diethyl ether is used, the alkylation takes place at the amino groups by the migration of the chlorine atoms to the nitrogen atoms, leaving available a bond at each end to connect the nitrogen atoms of adjacent chains (the nitrogen becoming so-called quinquevalent, as in the case of ammonium chloride).

This formation of water during the final curing is detrimental and causes swelling unless the wheel is being cured under pressure (as in a hot press or in an autoclave) excepting where a long enough time is allowed or the wheel is very porous. Consequently the present invention permits cold pressing for the formation of abrasive compositions that heretofore could not be satisfactorily made by the cold pressing method. However, since dichlor diethyl ether is a good wettant, a solvent for the aniline formaldehyde resin, and a cross linking agent and, in fact, is an excellent "plasticizer" for abrasive grains for carrying out the dry granular mix method, there is considerable advantage in using dichlor diethyl ether even though for some reason or other the wheels are to be molded in a hot press. Furthermore, dichlor diethyl ether provides hydrogen chloride which is released at the grinding line and, therefore, the addition of other halogenated products may be dispensed with (as in Example I) where a sufficient quantity of hydrogen chloride for the purpose is provided by the dichlor diethyl ether. The dichlor diethyl ether has the further advantages over furfural that it has a lower viscosity, a lower surface tension, and is not subject to deterioration under normal storage conditions.

However, mixtures of furfural and dichlor diethyl ether may be used, as they are miscible in all proportions. By the use of both furfural and triglycol dichloride, I can cause cross linking at the ortho positions and also at the amino groups, in accordance with the explanations and diagrams already given. Thus I may proceed as in the following example.

*Example XII*

Two hundred and ten grams of 80 grit fused alumina is stirred with four and five tenths cubic centimeters of a mixture of equal parts by weight of furfural and dichlor diethyl ether. Twelve and eight-tenths grams of soluble anhydrite ($CaSO_4$) and forty-two and eight-tenths grams of aniline formaldehyde resin made from one and five-hundredths molecular proportions of formaldehyde are added. The whole is mixed. The granular mix is molded in a hot press for two hours at ninety pounds steam pressure (160° C.) under a pressure of three tons to the square inch.

In any one of the examples, any other monomeric polyglycol dichloride selected from the group consisting of the di-, tri-, tetra- and penta- polyglycol dichlorides could have been used with substantially the same results and also in the same proportions. Of all the compounds mentioned, I prefer triglycol dichloride because it is a better solvent than diglycol dichloride and more readily available than tetra- and penta-glycol dichloride.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. Method of making abrasive articles comprising wetting a quantity of abrasive grain with monomeric polyglycol dichloride selected from the group consisting of di-, tri-, tetra, and penta-, glycol dichlorides, stirring into said wet abrasive grain a quantity of resin comprising the condensate in the presence of a strong acid of formaldehyde and primary aromatic amine selected from the group consisting of aniline, ortho-, meta-, and para-, toluidine, and diamino diphenyl methane, thus producing a plastic moldable dry granular mix, spreading said dry granular mix in a mold, pressing and curing at resin curing temperature.

2. A grinding wheel or other solid abrasive body comprising abrasive grains bonded with a bond comprising aniline-formaldehyde resin containing an appreciable quantity of the reaction product of monomeric polyglycol dichloride selected from the group consisting of di-, tri-, tetra-, and penta-, glycol dichlorides and an appreciable quantity of the reaction product of furfural.

3. A grinding wheel or other solid abrasive body comprising abrasive grains bonded with a bond comprising the condensation product of a primary aromatic amine selected from the group consisting of aniline, ortho, meta and para toluidine, and diamino diphenyl methane, with formaldehyde, said primary aromatic amine and formaldehyde being condensed in the presence of a strong acid forming long chains, said chains being cross linked to an appreciable extent at the nitrogen atoms with the radical

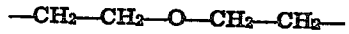

4. A grinding wheel or other solid abrasive body comprising abrasive grains bonded with a bond comprising the condensation product of a primary aromatic amine selected from the group consisting of aniline, ortho, meta, and para toluidine, and diamino diphenyl methane, with formaldehyde, said primary aromatic amine and formaldehyde being condensed in the presence of a strong acid forming long chains, and said bond containing the reaction product of the primary aromatic amine and formaldehyde with monomeric polyglycol dichloride selected from the group consisting of di-, tri-, tetra-, and penta-, glycol dichlorides.

5. A grinding wheel or other solid abrasive body comprising abrasive grains bonded with a bond comprising the condensation product of aniline with formaldehyde condensed in the presence of a strong acid forming long chains, said bond also containing the reaction product of the product of condensation of said aniline and formaldehyde with monomeric polyglycol dichloride selected from the group consisting of di-, tri-, tetra-, and penta-, glycol dichlorides.

6. Method of making abrasive articles comprising wetting a quantity of abrasive grain with a mixture of monomeric triglycol trichloride selected from the group consisting of di-, tri-, tetra-, and penta-, glycol dichlorides and furfural, stirring into said wet abrasive grain a quantity of resin comprising the condensate in the presence of a strong acid of formaldehyde and a primary aromatic amine selected from the group consisting of aniline, ortho-, meta-, and para-, toluidine, and diamino diphenyl methane, thus producing a mix, spreading said mix in a mold, pressing and curing.

7. Method of making abrasive articles comprising wetting a quantity of abrasive grain with a mixture of monomeric triglycol dichloride selected from the group consisting of di-, tri-, tetra-, and penta-, glycol dichlorides and furfural, stirring into said wet abrasive grain a quantity of resin comprising the condensate in the presence of a strong acid of formaldehyde and a primary aromatic amine selected from the group consisting of aniline, ortho-, meta-, and para-, toluidine, and diamino diphenyl methane, thus producing a mix, spreading said mix in a mold, pressing and curing.

8. A grinding wheel or other solid abrasive body comprising abrasive grains bonded with a bond comprising the condensation product of a primary aromatic amine selected from the group consisting of aniline, ortho-, meta-, and para-, toluidine, and diamino diphenyl methane, with formaldehyde, said primary aromatic amine and formaldehyde being condensed in the presence of a strong acid forming long chains, said chains being cross linked to an appreciable extent at the nitrogen atoms with the radical $-CH_2-CH_2-O-CH_2-CH_2-$ and the benzene rings of said chains being further cross linked to an appreciable extent with the radical

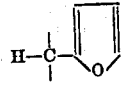

9. A grinding wheel or other solid abrasive body comprising abrasive grains bonded with a bond comprising aniline-formaldehyde resin containing an appreciable quantity of the reaction product of monomeric polyglycol dichloride selected from the group consisting of di-, tri-, tetra-, and penta-, glycol dichlorides with aniline-formaldehyde resin.

10. A grinding wheel or other solid abrasive body comprising abrasive grains bonded with a bond comprising the reaction product of monomeric polyglycol dichloride selected from the group consisting of di-, tri-, tetra-, and penta-, glycol dichlorides with aniline-formaldehyde resin.

LORING COES, JR.